United States Patent

Kawasaki et al.

[11] Patent Number: 6,061,887
[45] Date of Patent: May 16, 2000

[54] METHOD OF TRANSPORTING WORKPIECES IN ASSEMBLY LINE

[75] Inventors: Yoshinobu Kawasaki; Shigehiro Nakajima; Yoshimasa Ota, all of Sayama; Koichi Kida, Suzuka; Noriyuki Unose, Sayama; Yasuo Watanabe, Sayama; Mitsugu Takahashi, Sayama; Makoto Urano, Sayama, all of Japan

[73] Assignee: Honda Giken Kogyo Kabushiki Kaisha, Tokyo, Japan

[21] Appl. No.: 07/968,421

[22] Filed: Oct. 29, 1992

[30] Foreign Application Priority Data

Jul. 21, 1992 [JP] Japan ..................................... 4-193830
Sep. 2, 1992 [JP] Japan ..................................... 4-234683

[51] Int. Cl.⁷ ............................. B23P 21/00; B23P 19/00; B65G 47/28
[52] U.S. Cl. .................................... 29/407.01; 29/407.05; 29/407.1; 29/701; 29/703; 29/709; 29/711; 29/713; 29/822; 29/430; 198/460.1; 198/460.3
[58] Field of Search ............................ 29/407, 428, 701, 29/702, 703, 429, 430, 824, 709, 713, 714, 407.01, 407.05, 407.1, 711, 822; 364/468, 478; 198/341.03, 341.04, 460.1, 460.3

[56] References Cited

U.S. PATENT DOCUMENTS

| | | | |
|---|---|---|---|
| 3,796,327 | 3/1974 | Meyer et al. ........................ | 29/709 X |
| 4,472,783 | 9/1984 | Johnstone et al. . | |
| 4,829,445 | 5/1989 | Burney . | |
| 4,958,292 | 9/1990 | Kaneko et al. . | |

FOREIGN PATENT DOCUMENTS

| | | | |
|---|---|---|---|
| 0009645 | 1/1985 | Japan ..................................... | 29/701 |
| 0016348 | 1/1985 | Japan ..................................... | 29/701 |
| 1109059 | 4/1989 | Japan ..................................... | 29/702 |
| 3-154728 | 7/1991 | Japan . | |
| 3228531 | 10/1991 | Japan ..................................... | 29/430 |
| 4-64522 | 2/1992 | Japan . | |

*Primary Examiner*—Joseph M. Gorski
*Attorney, Agent, or Firm*—Armstrong, Westerman, Hattori, McLeland & Naughton

[57] ABSTRACT

In an assembly line in which at least two kinds of workpieces are transported by mixture and in which each of the workpieces is transported by a self-propelling transporting member, a transporting pitch for each kind of workpiece is set in advance based on a difference in the number of assembling man-hours required for each of them. The timing for starting the transporting member off a starting end of the assembly line is controlled according to the transporting pitch such that a pitch between a preceding transporting member and a succeeding transporting member becomes equal to that which is set for a workpiece to be transported by the preceding transporting member.

6 Claims, 4 Drawing Sheets

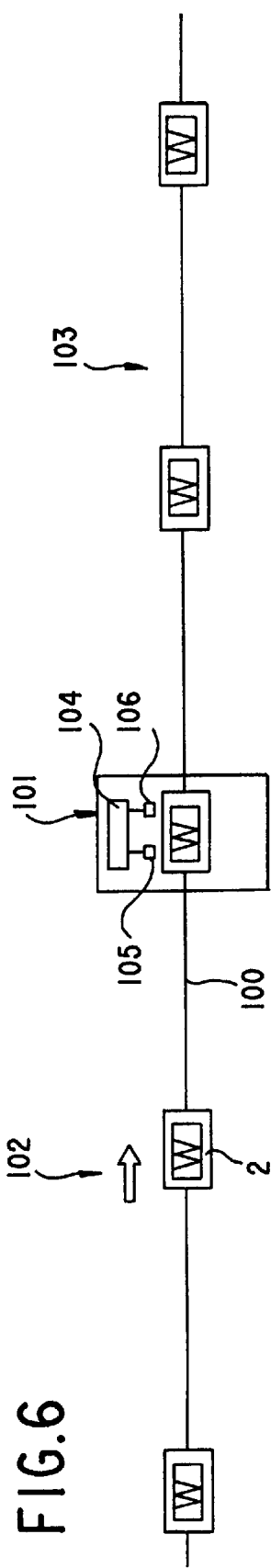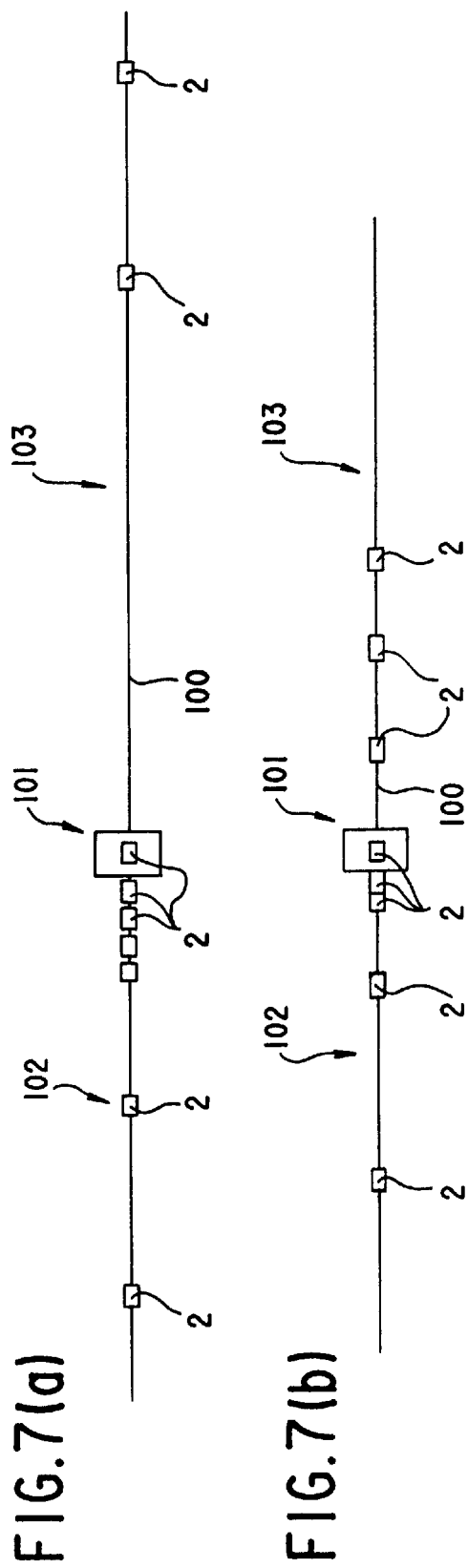

METHOD OF TRANSPORTING WORKPIECES IN ASSEMBLY LINE

BACKGROUND OF THE INVENTION

The present invention relates to a method of transporting workpieces in an assembly line in which at least two kinds of workpieces are transported by mixture.

Conventionally, it is normal practice to transport workpieces in an automobile assembly line or the like at a fixed speed and a fixed pitch. For example, there is known in Japanese Published Unexamined Patent Application No. 64522/1992 a method in which an endless conveyor is loaded or charged with pallets on each of which is placed a workpiece in the form of an automobile body, and in which the timing for loading or charging the endless conveyor with pallets is controlled in accordance with the lengths of the automobile bodies on the pallets so that, when the automobile bodies are transported by the conveyor at a fixed speed, the distance between the rear end of a preceding automobile body and the front end of a succeeding automobile body, i.e., the transporting pitch of the workpieces, always becomes constant even when two kinds or more of automobile bodies of different lengths are transported by mixture. When plural kinds of workpieces are transported by the assembly line, workers are allocated to suit such workpieces as will require the maximum number of assembling man-hours.

In the above-described example, the number of workers becomes superfluous when the workpieces to be treated in the assembly line are changed over to those requiring relatively smaller number of assembling man-hours and, consequently, it gives rise to a problem in reducing the product costs.

As a solution to this kind of problem, the following may be considered. Namely, each workpiece is transported by a self-propelled transporting member and, when a workpiece requiring relatively smaller number of man-hours is treated, the speed of transportation is increased so that the problem of superfluous workers can be solved through consequent increase in the number of production. However, at an initial time when the kind of workpieces has been changed over, the transporting members for the succeeding workpieces which require smaller number of assembling man-hours will catch up with the transporting members for the preceding workpieces which require larger number of assembling man-hours, with the result that the workpieces will be accumulated or get stacked. Therefore, the problem of superfluous workers cannot be solved.

In view of the above problems, the present invention has an object of providing a method of transporting workpieces in an assembly line in which at least two kinds of workpieces are transported by mixture so that the transportation can be performed effectively without giving rise to a problem of superfluous workers.

According to the present invention, for achieving the above object, there is provided a method of transporting workpieces in an assembly line in which at least two kinds of workpieces are transported by mixture, each of the workpieces being transported by a self-propelling transporting member, the method comprising the steps of: setting in advance a transporting pitch for each kind of workpiece based on a difference in the number of assembling man-hours required for each thereof; and controlling a timing for starting the transporting member off a starting end of the assembly line according to the transporting pitch such that a pitch between a preceding transporting member and a succeeding transporting member becomes equal to that which is set for a workpiece to be transported by the preceding transporting member.

By controlling the timing for starting the transporting member at the starting end of the assembly line, the pitch of one transporting member (i.e., a preceding transporting member) and a succeeding transporting member which respectively travel on the assembly line, i.e., the transporting pitch of the workpieces is varied. Here, if an arrangement is made such that the smaller is the number of assembling man-hours of the kind of workpieces, the narrower becomes the transporting pitch, the number of production becomes larger with the workpieces requiring smaller number of assembling man-hours. Therefore, the assembling work can be effectively performed without giving rise to the problem of superfluous workers. Further, there is no disadvantage in that, at the time of changing over the kind of workpieces, the succeeding workpieces catch up with the preceding workpieces, with the result that the workpieces becomes accumulated or get stacked.

In addition, in case an automated working station having therein an automated device is provided in an intermediate portion of the assembly line, the transporting member is stopped at the automated working station to perform the assembling works on the workpiece by the automated device, and the transporting member is thereafter re-started. If this timing for re-starting is controlled according to the transporting pitch which is set in advance, the manual assembling works in the rear stage of the automated working station can be as effectively performed as in the above-described example.

As the method of determining the pitch between a preceding transporting member and a succeeding transporting member, there are the following two ways. Namely, one way is to adjust the pitch to the transporting pitch which is set relative to the workpiece to be transported by the succeeding transporting member. The other way is to adjust the pitch to the transporting pitch which is set relative to the workpiece to be transported by the preceding transporting member. According to the former way, if the workpiece to be transported by the preceding transporting member is, for example, the kind requiring larger number of assembling man-hours and if the the workpiece to be transported by the succeeding transporting member is the kind requiring smaller number of assembling man-hours, the pitch between the preceding workpiece and the succeeding workpiece becomes narrow. As a result, when workers perform assembling works to the workpiece while they move together with the transporting member from the starting end to the terminal end of each working region of the assembly line, the succeeding transporting member will enter their own working region over the starting end thereof. It follows that the position at which the assembling works are to be started varies with the kind of workpieces. On the other hand, according to the latter way, the pitch between the preceding workpiece and the succeeding workpiece is enlarged according to the workpiece that is transported by the preceding transporting member and that requires larger number of assembling man-hours. Therefore, when the workers have returned to the starting end of their own working region after finishing assembling works while moving together with the preceding transporting member, the succeeding transporting member will just have reached the starting end thereof. It follows that, even if the kind of workpieces is changed over, the position at which the assembling works are to be started does not vary. Therefore, the position for feeding parts at each working region needs not be varied depending on the kind of workpieces, resulting in an advantage in view of material handling or transporting of the parts. In this case, the timing for starting the transporting member can be automatically controlled to suit the preceding workpiece by: providing each of the transporting members or the workpieces with transportable identifying means which identifies the kind of the workpieces; attaching to the transportable identifying means data representing the kind of a present workpiece to be presently transported by any of the transporting members as well as data representing the kind of a preceding workpiece to be transported by the preceding transporting member; reading out with a sensor those data relating to the kind of the preceding workpiece which are attached to transportable identifying means mounted on a transporting member that is waiting for starting or to a workpiece mounted thereon; and controlling a timing for starting the waiting transporting member according to a transporting pitch which is set for the kind of workpiece whose data are read out.

Furthermore, when the transporting pitch is enlarged, some of the transporting members become superfluous. In such a case, the change in the required number of transporting members as a consequence of the change in the transporting pitch can be freely dealt with by providing stock means which can take in or take out transporting members to and from a return path which extends from a terminal end to a starting end of the assembly line, and by stocking into the stock means transporting members which have become superfluous as a result of enlargement of the transporting pitch in the assembly line.

On the other hand, instead of providing stock means, a terminal end and a starting end of the assembly line may be connected via a storage line, and a travelling speed of transporting members in the storage line may be controlled according to a change in the transporting pitch in the assembly line so that, when the transporting pitch is enlarged, the superfluous number of transporting members can be kept stored in the storage line by decreasing the travelling speed.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 5 is a plan view showing another example of the stock means;

FIG. 6 is a plan view of an assembly line having an automated working station; and FIG. 7, consisting of FIG. 7(a) and FIG. 7(b), is a diagram showing the condition of the assembly line in which a trouble has occurred (7a) and a diagram showing the condition in which the assembly line has been recovered from the trouble back to the normal condition (7b).

DETAILED DESCRIPTION OF A PREFERRED EMBODIMENT

One embodying example of the present invention will now be explained with reference to the accompanying drawings.

Figure 1:
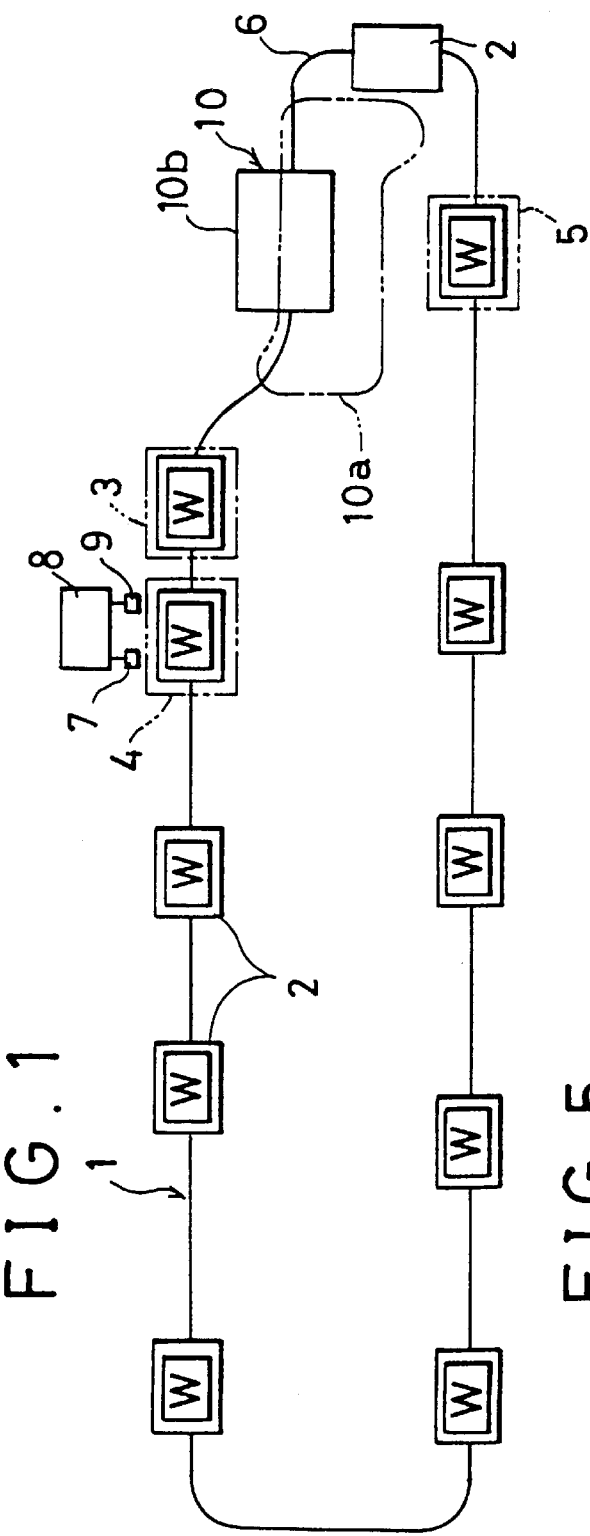
FIG. 1 is a plan view of one example of an assembly line to which the present invention method is applied.
Figure 2:
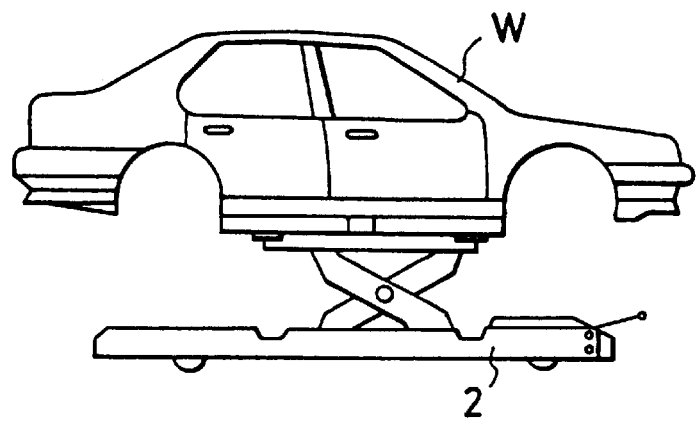
FIG. 2 is a side view showing one example of a transporting member.

Referring to FIG. 1, numeral 1 denotes an automobile assembly line in which various parts are assembled to automobile bodies. Each automobile body W, which is a workpiece, is transported along the assembly line 1 while it is mounted on a self-propelled transporting cart 2 as shown in FIG. 2. Predetermined assembling works are performed on each automobile body W which is placed on the transporting cart 2 while workers are moving together with the transporting cart 2 in a plurality of working regions of the assembly line 1.

At the starting end of the assembly line 1, there are provided a loading or charging station 3 and a succeeding waiting station 4. On the other hand, at the terminal end of the assembly line 1, there is provided an unloading or discharging station 5. In this unloading station 5 the automobile body W on the transporting cart 2 is transferred to an unillustrated overhead conveyor and is conveyed or discharged to the next working or processing step. The emptied transporting cart 2 is returned from the unloading station 5 to the loading station 3 via a return path 6. Tn the loading station 3 an automobile body W which is transported from a previous working or processing step by an unillustrated overhead conveyor is loaded or placed onto the transporting cart 2. After moving to the waiting station 4 and temporarily stopping there, the transporting cart 2 travels along the assembly line 1 at a fixed speed.

In the above-described arrangement, it is so arranged that plural kinds of automobile bodies W are transported by mixture along the assembly line 1. The transporting pitch is determined in advance according to the difference in the assembling man-hours of various kinds of workpieces such that the smaller becomes the assembling man-hours to be required by a particular kind, the smaller becomes the transporting pitch. The timing for starting a transporting cart 2 that is present in the waiting station 4 is controlled as described below.

Figures 4A, 4B, 4C:
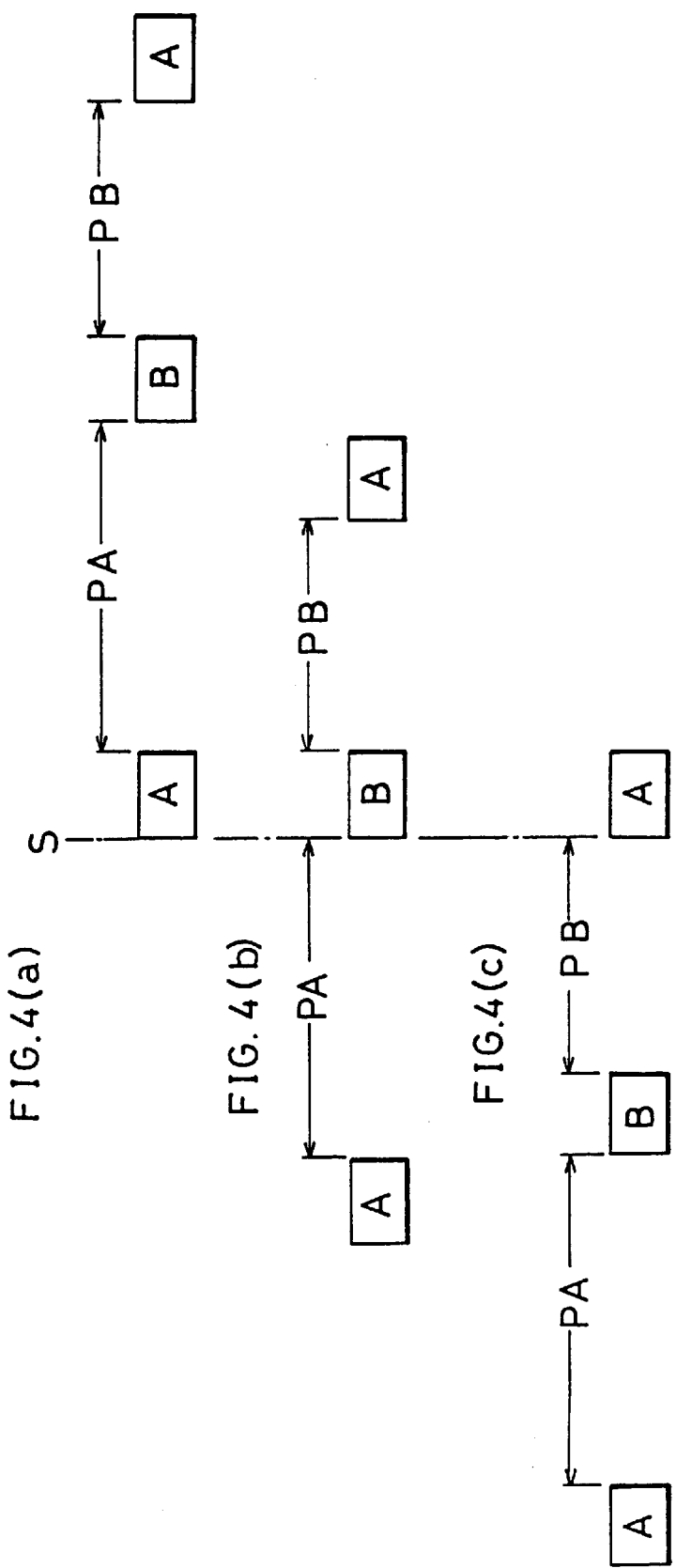
FIG. 4, consisting of FIGS. 4(a), 4(b) and 4(c), is an explanation diagram showing the movement of workpieces along the assembly line.

Namely, a portable identifying means which functions to identify the kind of the automobile body is attached to the automobile body W or to the transporting cart 2. In the waiting station 4, there are provided a detecting sensor 7 which detects the kind of automobile body based on the identifying means, a controller 8 which inputs the signal from the detecting sensor 7, and a signal transmitting means 9 which transmits the signal to the transporting cart 2. The transporting pitch of each kind of automobile body is stored in memory in the controller 8. The portable identifying means is provided with data representing the automobile body on the transporting cart 2 that is provided with the identifying means (hereinafter referred to as the "present automobile body") and data representing the automobile body on the preceding transporting cart (hereinafter referred to as the "preceding automobile body"). The data relating to the kind of the preceding automobile body is read out by the detecting sensor 7, and a transporting pitch corresponding to the read-out kind of automobile body is read out or picked up. At the lapse of the time corresponding to the transporting pitch that is read out from the time of starting of the preceding transporting cart 2 out of the waiting station 4, a travel instruction signal is transmitted from the controller 8 to the transporting cart 2 that is present in the waiting station 4 to start the transporting cart 2. It is thus so arranged that the pitch between one transporting cart (i.e., the preceding transporting cart) and the succeeding transporting cart 2 is controlled to the one corresponding to the kind of the preceding automobile body. Let the kind of automobile body requiring larger number of assembling man-hours be called "A-automobile" and the kind of automobile body requiring smaller number of assembling man-hours be called "B-automobile." According to the above-described arrangement, an example is herein considered, as shown in FIG. 4, in which the automobile bodies are transported in the order of A-automobile, B-automobile and A-automobile. A relatively larger pitch PA for the A-automobile is reserved or maintained between the A-automobile and the B-automobile so that the B-automobile reaches the starting point S as shown in FIG. 4(b) when workers return to the starting point S after they have finished the assembling works on the A-automobile while moving along a relatively long working distance for the A-automobile from the starting end S of their own working region. At the same time, a relatively smaller pitch PB for the B-automobile is reserved or maintained between the B-automobile and the succeeding A-automobile so that the A-automobile reaches the starting point S as shown in FIG. 4(c) when the workers return to the starting point S after they have finished the assembling works on the B-automobile while moving along a relatively short working distance for the B-automobile from the starting end S. It follows that the position for starting the assembling work does not vary even if the kind of automobile body is changed and therefore that the position of charging or feeding the parts needs not be changed.

Also in an assembly line in which an automated assembling station is provided in an intermediate portion thereof and in which the transporting cart 2 is stopped in the automated assembling station for performing assembling works by an automated device and is thereafter re-started, the timing for starting the transporting cart 2 is controlled in a similar manner as in the above-described arrangement in order to transport it to a manual working zone which succeeds the automated assembling station.

A mistake in identification can be prevented by comparing those data relating to the kind of the preceding automobile body which are attached to the identifying means on the transporting cart 2 staying in the waiting station 4 or in the automated assembling station and those data relating to the kind of the present automobile body which are attached to the identifying means on the preceding transporting cart 2 that goes just in front of the above-described transporting cart 2.

Figure 3:
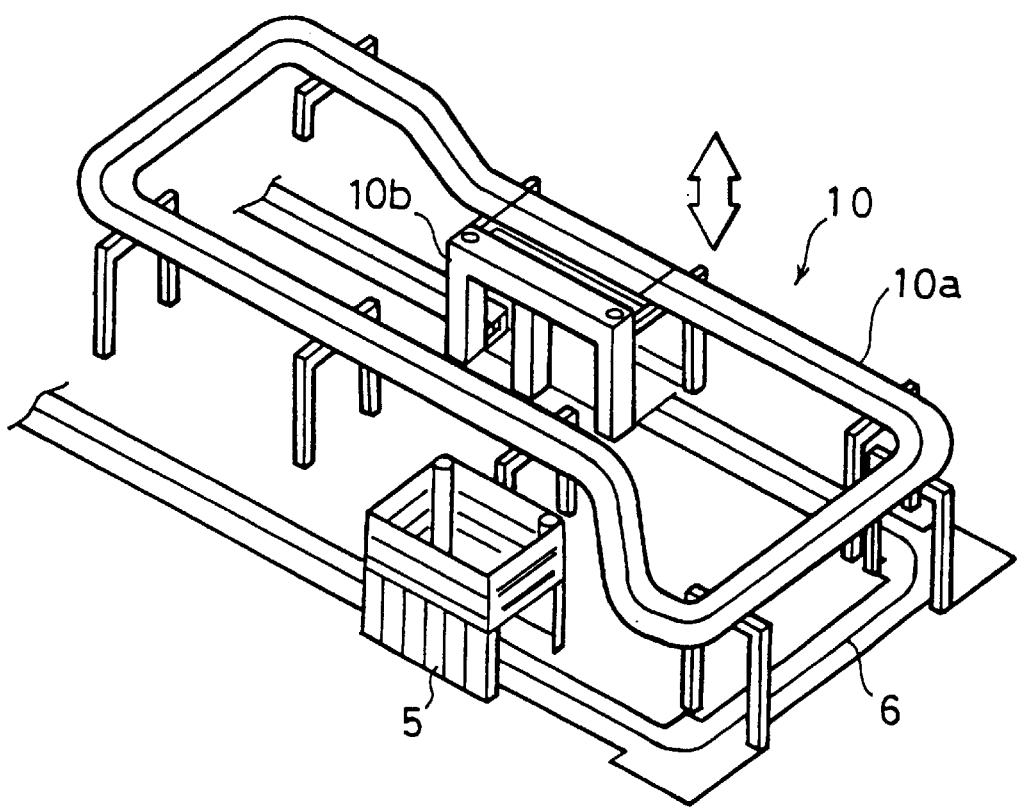
FIG. 3 is a perspective view showing one example of a stock means.

When the transporting pitch is enlarged, some of the transporting carts 2 will become superfluous. Therefore, there is provided in the return path 6 a stock means 10 which can take in and take out the transporting carts 2 to and from the return path 6 so that the superfluous transporting carts 2 can be stocked in the stock means 10. In this embodiment, the stock means 10 comprises, as shown in FIG. 3, a hanger conveyor 10a which hangs transporting carts 2 and a transfer device 10b which is disposed in a predetermined position in the return path 6. Transporting carts 2 can be handed or received between an unillustrated hanger of the hanger conveyor 10a and the return path 6. When the transporting pitch is enlarged, some of the transporting carts 2 are stocked on the hanger conveyor 10a. When the transporting pitch is decreased, those transporting carts 2 are loaded or returned from the hanger conveyor 10a to the return path 6. It may also be so arranged that a stock rail which is connected to the return path 6 via a switching device is provided to stock superfluous transporting carts 2 on the stock rails.

Furthermore, as shown in FIG. 5, the following arrangement may also be employed. Namely, the unloading station 5 and the loading station 3 at the terminal end and the starting end, respectively, of the assembly line 1 are connected together via a relatively long storage line 11. When the transporting pitch is enlarged, the travelling speed of the transporting carts 2 in the storage line 11 is decreased so that the superfluous number of the transporting carts 2 may be stored in the storage line 11.

In case there exists, in an intermediate portion of the assembly line, a working region such as an automated working station for performing assembling works while transporting members are stopped therein, the succeeding transporting members are accumulated or get stacked on the upstream side of the working region if the re-starting of the transporting members in the working region is delayed due to a trouble therein. This results in a delay in the assembling works on the downstream side of the working region and, consequently, in a decrease in the number of production. This kind of accumulation may occur even if the transporting pitch is not changed according to the kind of automobile bodies. An explanation is made hereinbelow about the measures to be taken when such accumulation has occurred with reference to an example in which, as shown in FIG. 6, automobile bodies W as workpieces are transported along an assembly line 100 by self-propelling transporting carts 2 at a fixed pitch.

In an intermediate portion of the assembly line 100, there is provided an automated working station 101 in which assembling works by unillustrated robots or the like are performed. In manual working regions 102, 103 on respectively the upstream side and the downstream side thereof, workers perform predetermined assembling works on the automobile bodies W which are placed on the transporting carts 2, while they move together with the transporting carts 2 at each assembling step. In the automated working station 101, each of the transporting carts 2 is stopped at a predetermined position to perform assembling works on the automobile body by the automated device.

On a side of the assembly line at the automated working station 101, there are provided a controller 104, a sensor 105 which identifies the kind of automobile body through a type-identifying means attached to the automobile body or the transporting cart 2, and a signal transmitting means 106 which transmits signals to the transporting carts 2. The automated device is operated according to the kind of automobile body that has been identified by the sensor 105. Upon completion of the assembling works, the transporting cart 2 is re-started by the signal from the signal transmitting means 106 as described hereinbelow.

The speed and the pitch of the transporting carts 2 are set in accordance with a line tact $t_0$ which is determined by a production schedule. Normally, the transporting cart 2 is sequentially transported from the upstream manual working region 102 into the automated working station 101 at a time interval of $t_0$. Here, the time $t_1$ required for the assembling works in the automated working station 101 is shorter than $t_0$. At the lapse of a waiting time $t_2$ which is the difference between $t_0$ and $t_1$ after the assembling works in the automated working station 101 have been completed, a signal to re-start the transporting cart 2 is transmitted from the line-side controller 104 to the transporting cart 2 via the signal transmitting means 106. The transporting carts 2 are thus sequentially transported into the downstream manual working region 103 at the time interval of $t_0$.

However, if the re-starting of the transporting cart 2 is delayed due to a trouble or the like in the automated device in the automated working station 101, the succeeding transporting carts 2 will be accumulated or get stacked on the upstream side of the automated working station 101 as shown in FIG. 7(a). Even if the trouble has been remedied and the assembling works in the automated working station 101 are started again, the accumulation on the upstream side will remain as it is if the transporting carts 2 are transported into the downstream manual working region 103 at the time interval of $t_0$. This results in a consequent delay in the assembling works on the downstream side and, accordingly, the scheduled number of production cannot be attained.

Therefore, when the assembling works in the automated working station 101 have been re-started, the waiting time from the completion of the assembly works in the automated working station 101 to the re-starting of the transporting carts 2 is made shorter than the above-described $t_2$ by a value obtained by multiplying the normal value $t_2$ ($=t_0-t_1$) by a predetermined ratio $\alpha$ of shortening. By thus making shorter the stopping time of the transporting cart 2 in the automated working station 101 than $t_0$, the accumulation on the upstream side is eliminated.

In this case, in the manual working region 103 on the downstream side of the automated working station 101, the pitch of the transporting carts 2 becomes narrower as shown in FIG. 7(b), with the result that a heavy load will be imposed on the workers therein. This heavy load may be alleviated by temporarily allocating, to the downstream manual working region 103, the workers who have already finished their own assembling works, during the accumulation, in the upstream manual working region 102.

Let the time by which the transporting cart 2 which is inside the automated working the station 101 during the occurrence of the trouble exceeds the normal stopping time $t_0$ ($=t_1+t_2$), be a value of t. Then, the number m of the transporting carts 2 accumulated on the upstream side of the automated working station 101 after the recovery from the trouble will be $t_1+(1-\alpha)t_2$ and is made shorter then the normal stopping time of $t_1+t_2$ by a vale of $\alpha t_2$. Let the number of transporting carts 2 whose stopping time shell be shortened be n. Then, the time will be saved by $\alpha\ t_2 n$. If this value becomes t ($=t_0 m$), the accumulation on the upstream side will have been eliminated.

Accordingly, if the excess stopping time t of the transporting cart 2 at the automated working station 101 is measured, the number n of transporting carts whose waiting time shall be shortened, among all of the succeeding transporting carts 2, is made to be n $=t/\alpha\ t_2$ (below decimal point cut down), and the waiting time of the (n+1)th transporting cart and downwards is returned to $t_2$, there will be no excessive load imposed on the workers on the downstream side.

A sensor for detecting the degree of accumulation of the transporting carts 2 may be provided on a side of the assembly line on the upstream side of the automated working station 101 in order to determine the timing for returning the waiting time to $t_2$ depending on the degree of accumulation. However, if the number of the transporting carts whose waiting time shall be shortened is determined by the above-described method, there will be required no special sensor and is therefore advantageous from the viewpoint of costs.

In case plural kinds of automobile bodies W are transported by mixture along the assembly line 100, if the waiting time for the transporting carts 2 to transport the kind of automobile bodies requiring larger number of assembling man-hours within one assembling or processing step is shortened equally as that for the transporting carts 2 to transport the kind of automobile bodies requiring smaller number of assembling man-hours, there will be imposed an excessive load on the works for the automobile bodies requiring larger number of assembling man-hours. In such a case, the rate $\alpha$ of shortening the waiting time is set for each kind of automobile body and is stored in the controller 104 such that the smaller becomes the number of man-hours, the larger becomes the rate of shortening. When the kind of the automobile body W on the transporting cart 2 which is in the automated working station 101 is identified by the above-described sensor 105, a rate $\alpha$ of shortening corresponding to that kind is searched to compute the waiting time.

However, the rate $\alpha$ of shortening needs not be varied for each kind of automobile body if a different normal value $t_2$ of waiting time is set for each kind of automobile body such that the larger becomes the number of assembling man-hours, the longer becomes the transporting pitch of the workpiece W and the smaller becomes the number of assembling man-hours, the shorter it becomes even at the normal time.

It is readily apparent that the above-described method of transporting workpieces in an assembly line meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of transporting workpieces in an assembly line, comprising the steps of:

positioning a first self-propelled transporting member and a second self-propelled transporting member at a starting end of an assembly line, wherein said first transporting member is provided with a first workpiece thereon and said second transporting member is provided with a second workpiece thereon, and said first workpiece requires a different amount of assembling man-hours than does said second workpiece;

determining a transporting pitch to be established between said first transporting member and said second transporting member as said first transporting member and said second transporting member are self-propelled along the assembly line, wherein the transporting pitch to be established increases as the number of assembly man-hours required for the first workpiece increases;

sending said first transporting member off from said starting end toward an assembly location of the assembly line; and sending said second transporting member off from said starting end, such that a distance between said first transporting member and said second transporting member becomes equal to the determined transporting pitch and remains equal thereto until said first transporting member arrives at the assembly location.

2. A method of transporting workpieces in an assembly line according to claim 1, further comprising the steps of:

stopping each of said transporting members at an automated working station for performing assembling works on each of said kinds of workpieces placed on each of said transporting members at said automated working station which is provided in an intermediate portion of said assembly line, while each of said transporting members is stopped at said working station; and controlling a timing for starting each of said transporting members off from said working station after said assembling works have been finished so as to establish said transporting pitch between said adjacent transporting members consistent with said pre-set transporting pitch.

3. A method of transporting workpieces in an assembly line according to claim 1, further comprising the steps of:

providing each of said transporting members or each kind of said workpieces with transportable identifying means for identifying the kind of said workpieces;

attaching to said transportable identifying means data representing the kind of a present workpiece to be presently transported by any of said transporting members as well as data representing the kind of a preceding workpiece to be transported by said preceding one of said transporting members;

reading out with a sensor data relating to said kind of workpieces in said preceding one of said transporting members which are attached to transportable identifying means mounted on a transporting member that is waiting to be started or to a workpiece mounted thereon; and controlling a timing for starting said waiting transporting member according to a transporting pitch which is set for the kind of workpiece having data which are read out.

4. A method of transporting workpieces in an assembly line according to claim 2, further comprising the steps of:

providing each of said transporting members or said workpieces with transportable identifying means for identifying the kind of said workpieces;

attaching to said transportable identifying means data representing the kind of a present workpiece to be presently transported by any of said transporting members as well as data representing the kind of a preceding workpiece to be transported by said preceding one of said transporting members;

reading out with a sensor data relating to said kind of workpieces in said preceding one of said transporting members which are attached to transportable identifying means mounted on a transporting member that is waiting to be started or on a workpiece mounted thereon; and controlling a timing for starting said waiting transporting member according to a transporting pitch which is set for the kind of workpiece having data which are read out.

5. A method of transporting workpieces in an assembly line according to claim 1, further comprising the steps of:

providing stock means for taking in or taking out transporting members to or from a return path which extends from a terminal end to a starting end of said assembly line; and stocking into said stock means transporting members which have become superfluous as a result of enlarging said transporting pitch in said assembly line.

6. A method of transporting workpieces in an assembly line according to claim 1, further comprising the steps of:

connecting a terminal end and a starting end of said assembly line via a storage line; and controlling a travelling speed of transporting members in said storage line according to said transporting pitch in said assembly line.

* * * * *